(12) United States Patent
Kim et al.

(10) Patent No.: US 8,111,484 B2
(45) Date of Patent: Feb. 7, 2012

(54) ACTUATOR LATCH MECHANISM AND HARD DISK INCLUDING THE SAME

(75) Inventors: Kyung-ho Kim, Seoul (KR); Min-pyo Hong, Suwon-si (KR); Dongho Oh, Seocho-gu (KR); Yu-sung Kim, Seoul (KR); Yong-Jae Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 297 days.

(21) Appl. No.: 12/502,246

(22) Filed: Jul. 14, 2009

(65) Prior Publication Data
US 2010/0014194 A1  Jan. 21, 2010

(30) Foreign Application Priority Data

Jul. 18, 2008 (KR) .................. 10-2008-0070191

(51) Int. Cl.
*G11B 5/54* (2006.01)
(52) U.S. Cl. .................................. 360/256.2
(58) Field of Classification Search ........... 360/256.2, 360/256.4, 254.8, 265.1, 254.3, 256.1, 256.3
See application file for complete search history.

(56) References Cited

U.S. PATENT DOCUMENTS

| | | | |
|---|---|---|---|
| 2008/0180852 A1* | 7/2008 | Kim et al. | 360/256.2 |
| 2008/0186632 A1* | 8/2008 | Kim et al. | 360/256.2 |
| 2008/0192385 A1* | 8/2008 | Choi et al. | 360/256.2 |
| 2008/0192386 A1* | 8/2008 | Hwang et al. | 360/256.2 |

FOREIGN PATENT DOCUMENTS

| | | |
|---|---|---|
| JP | 08221915 | 8/1996 |
| JP | 2001357638 | 12/2001 |
| JP | 2005044475 A | 2/2005 |
| KR | 1020050117256 A | 12/2005 |

* cited by examiner

*Primary Examiner* — Allen Cao
(74) *Attorney, Agent, or Firm* — Volentine & Whitt, PLLC (57) ABSTRACT

An actuator latch mechanism of a hard disk drive (HDD) includes a latch lever and a magnetic latch carried by the latch lever. The latch lever is mounted to a base of the HDD so as to be rotatable and prevents an actuator arm from rotating from a position, at which a read/write head carried by the actuator arm is parked, to a read/write position at which the read/write head is located over a recording surface of a disk. A bobbin on which a VCM coil is provided extends from a rear end of the actuator arm. A permanent magnet of the VCM is fixed to the base as juxtaposed with the bobbin. The magnetic latch is carried by an arm of the latch lever and interacts with the (magnetic field generated by) the permanent magnet of the VCM to generate a net force which cause the latch lever to latch the actuator arm in place when current is not being supplied to the VCM coil, and interacts with both the (magnetic field generated by) the permanent magnet of the VCM and (the electromagnetic field generated by) the VCM coil when current is supplied to the VCM coil to produce a net force that causes the latch lever to release the actuator arm.

15 Claims, 6 Drawing Sheets

ACTUATOR LATCH MECHANISM AND HARD DISK INCLUDING THE SAME

BACKGROUND OF THE INVENTION

The present invention relates to an actuator latch mechanism of a hard disk drive (HDD) for latching an actuator arm in place when external shock or vibration is applied to the HDD.

HDDs are widely used as auxiliary memory devices of computer systems because of their ability to rapidly access large amounts of data. In general, HDDs employ a read/write head to record data on a disk or reproduce data stored on the disk. The disk has a number of tracks, and the data is stored in bits on each track.

The data storage capacity of a typical disk, i.e., the number of TPI (tracks per inch) and BPI (bits per inch), has increased substantially in recent times. As a result, the fields in which HDDs are being used as memory devices have expanded. In particular, there is a growing demand for compact HDDs for portable electronic products such as laptops, personal digital assistants (PDAs), and mobile phones. Compact HDDs currently have a standard size of 2.5 inches (disk diameter). However, a compact 0.85 inch HDD has been developed for use in mobile phones or MP3 players.

In addition to a read/write head, an HDD typically includes a disk pack having a disk for recording data and a spindle motor for rotating the disk about an axis, a head stack assembly (HSA) having an actuator arm which carries the read/write head, a voice coil motor (VCM) for rotating the actuator arm to position the read/write head over the disk, and a base on which the abovementioned elements are installed.

The read/write head reads and writes data while floating at a predetermined height over a data area of the disk where the tracks are provided, and while the disk is rotating. When the HDD is not operated, that is, when the disk is stationary, the read/write head is parked at a position outside the data area of the disk to prevent the read/write head from colliding against the data area of the disk.

To this end, the HDD may employ a contact start stop (CSS) parking system or a ramp loading parking system. In the CSS parking system, an inner circumferential portion of the disk constitutes a parking zone in which data is not recorded, and the read/write head is parked in contact with the parking zone when the HDD is not in operation. In the ramp loading parking system, a ramp is disposed radially outwardly of the disk and an end tab is provided at a leading end portion of the actuator arm. The end tab is supported by the ramp when the read/write head may is parked.

However, a strong external shock or vibration applied to the HDD when the read/write head is parked may jar the actuator arm loose, causing the actuator arm to rotate to such an extent that the read/write head contacts the data area of the disk. In this case, the read/write head and/or the data area of the disk may be damaged. To prevent such a problem, a latch mechanism is provided to latch onto the actuator arm when the read/write head is parked and an excessive amount of shock or vibrations is applied to the HDD.

There are a variety of known types of latch mechanisms. One is a multi-pawl type of latch mechanism that includes a latch lever having several hooks at a leading end thereof, and a bobbin protrusion which extends from a rear end portion of the actuator arm. The latch lever is supported so as to be rotatable relative to the base, and is designed to latch onto the bobbin protrusion when the actuator arm is jarred loose from the state in which the read/write head is parked in an attempt to prevent the read/write head from moving onto the data area of the disk. Although the multi-pawl type of latch mechanism can keep the actuator arm latched when certain shocks are applied to the HDD, the actuator arm may nonetheless be unlatched under certain circumstances such as when excessive external shocks are applied to the HDD in many different directions or due to a "rebound-effect". A rebound effect is generated when the actuator collides against a hook of the latch lever, the latch lever rebounds from the actuator arm, and the actuator arm collides with the hook again all due to the inertia of the latch lever and actuator arm.

Another type of latch mechanism includes a latch lever having a hook at a leading end thereof and a magnetic retract ball at a rear end thereof, and a bobbin protrusion which extends from a rear end portion of the actuator arm and which also includes a magnetic retract ball. The latching and unlatching of the actuator arm is controlled by the bobbin protrusion and the latch lever using the magnetic force between the retract balls and a magnet of the VCM. However, the size of the retract balls and the distances between the actuator arm, bobbin protrusion portion and the hook of the latch lever necessary to ensure the latching of the actuator arm while the read/write head is parked compromise the ability of the latch mechanism to unlatch the actuator arm when the HDD is to perform a read/write operation.

SUMMARY

An object of the present invention is to provide an actuator latch mechanism of an HDD which firmly latches an actuator arm even when external shock or vibration is applied to the HDD when current is not being supplied to a coil of a voice coil motor (VCM) and also smoothly unlatches the actuator arm when current is supplied to the VCM coil.

Similarly, an object of the present invention is to provide an HDD in which an actuator arm of the HDD carrying a read/write head remains firmly latched even when external shock or vibration is applied to the HDD and in which the actuator arm is reliably released when the HDD is turned on and current is supplied to the VCM coil.

According to an aspect of the present invention, there is provided an actuator latch mechanism of a hard disk drive, having a latch lever including a latch arm supported so as to be movable relative to the base between a latching position and an unlatching position, and a magnetic latch supported by the latch arm and which interacts with (the magnetic field generated by) a permanent magnet of a voice coil motor (VCM) of the hard disk drive when current is not supplied to the VCM coil of the VCM, and which interacts with both (the magnetic field generated by) the permanent magnet of a voice coil motor (VCM) and the VCM coil when current is supplied to the VCM coil. In such a hard disk drive, an actuator arm carries a read/write head and is supported so as to be rotatable relative to the base in a first direction of rotation between a parking position at which the read/write head is parked and a read/write position at which the read/write head performs a read/write operation. In the actuator latch mechanism of the present invention, the magnetic latch is positioned by the latch arm such that while the actuator arm is in the parking position, the magnetic latch interacts with magnetic field produced by the VCM magnet to generate a magnetic force of attraction which urges the latch arm towards the latching position. On the other hand, the magnetic latch is positioned by the latch arm such that while the actuator arm is in the parking position the magnetic latch interacts with the electromagnetic field produced by the VCM coil to generate a magnetic force which urges the latch arm towards the unlatching position.

According to another aspect of the present invention, there is provided A hard disk drive comprising a base, an actuator arm mounted to the base so as to be rotatable relative to the base, a read/write head carried by the actuator arm at a forward end of the actuator arm, a bobbin extending from a rear end of the actuator arm, a voice coil motor (VCM) including a VCM permanent magnet fixed relative to the base and juxtaposed with the bobbin of the actuator arm, and a coil disposed on the bobbin of the actuator arm, and magnetic latch means for generating a magnetic field that interacts with the magnetic field of the VCM magnet to generate a magnetic force of attraction with the VCM magnet which urges the latch arm towards a latching position, and for generating a magnetic field that interacts with the electromagnetic field generated by the VCM coil to generate a magnetic force of repulsion with the VCM coil which urges the latch arm towards an unlatching position.

According to still another aspect of the present invention, there is provided a latch mechanism of an HDD, and an HDD comprising the same in which the latch mechanism includes a latch arm mounted to the base so as to be moveable relative to the base between a latching position and an unlatching position, and a magnetic latch carried by the latch arm and wherein the magnetic latch includes a permanent latch magnet, and a latch yoke of magnetic material. Preferably, the latch yoke is of carbon steel. Also, the magnetic latch may be integrally formed with the arm of the latch lever by an insert injection mold method in which the latch magnet and the latch yoke are inserted into a mold, and the arm is formed by injecting material into the mold.

The latch arm of the latch lever may be mounted as to be rotatable relative to the base, and the latch lever preferably has a hook at a leading end of the latch lever to selectively engage with and disengage from the bobbin.

The polarity of the latch magnet has the same orientation as that of the VCM magnet. Thus, the latch magnet and the VCM magnet repel each other when the actuator arm is in a position at which the read/write head of the HDD is parked. Also, the magnitude of the magnetic force of attraction between the latch yoke and the VCM magnet is greater than the magnitude of the magnetic force of repulsion between the latch magnet and the VCM magnet when the actuator arm is at the parking position. Thus, a net force is produced between the VCM magnet and the magnetic latch which urges the latch arm towards the latching position when current is not being supplied to the VCM coil.

The latch magnet is substantially located above a linear section of the VCM coil when the actuator arm is in the parking position and the magnetic latch is in the latching position. In this case, when current is being supplied to the VCM coil, the sum of the magnitudes of the magnetic force of repulsion between the latch magnet and the VCM coil and the magnetic force of repulsion between the latch magnet and the VCM magnet is greater than the magnitude of the magnetic force of attraction between the latch yoke and the VCM magnet.

Also, the latch yoke is preferably disposed on the latch magnet such that magnetic flux of the magnetic field generated by the latch magnet when current is supplied to the VCM coil forms a closed loop through the latch yoke and the latch lever.

BRIEF DESCRIPTION OF THE DRAWINGS

These and other objects, features and advantages of the present invention will be more clearly understood from the following detailed description taken in conjunction with the accompanying drawings in which.

DETAILED DESCRIPTION OF THE PREFERRED EMBODIMENTS

The present invention will now be described hereinafter with reference to the attached drawings. Like reference numerals in the drawings denote like elements.

Figure 1:
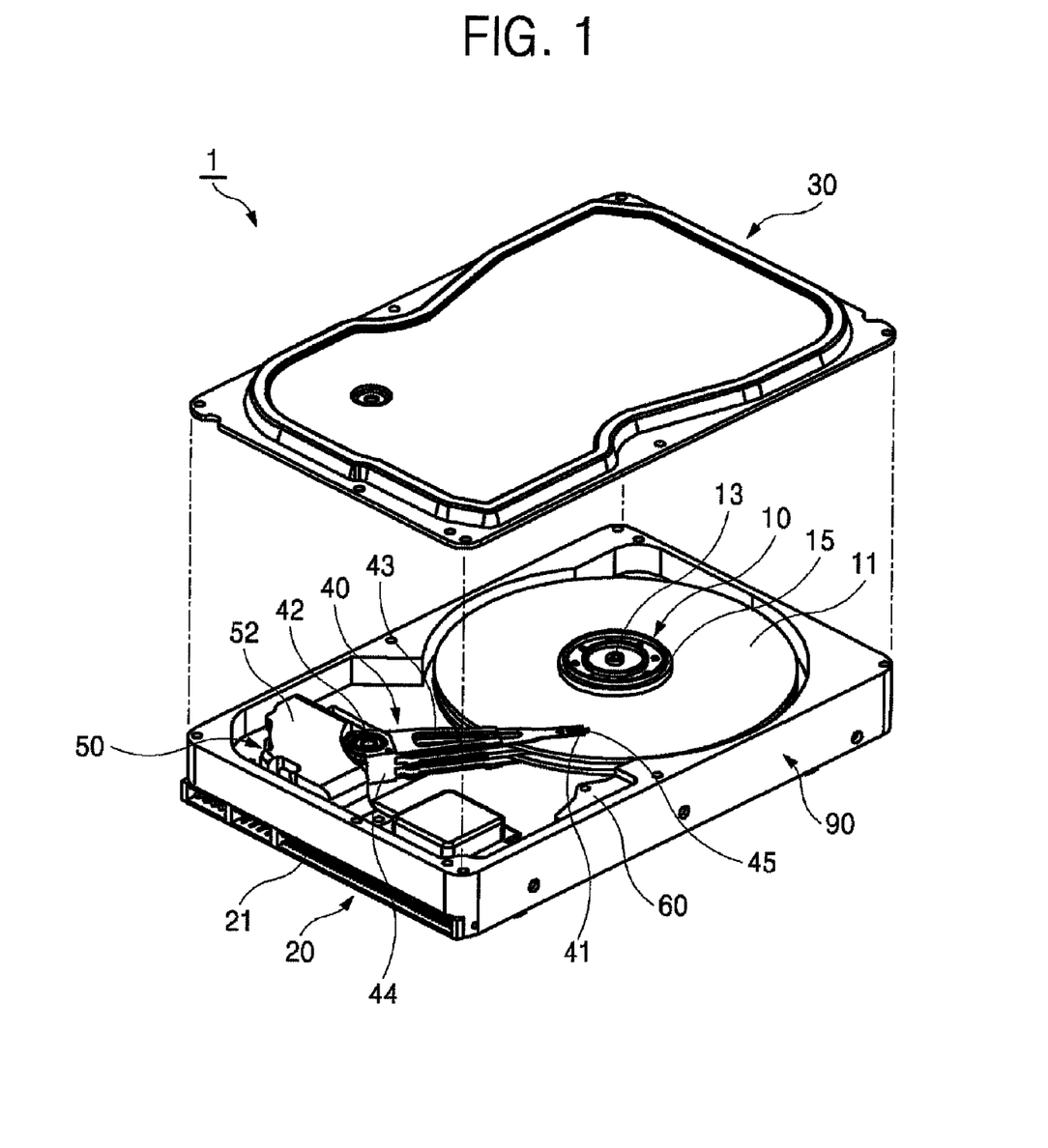
FIG. 1 is a partially exploded perspective view of an embodiment of an HDD according to the present inventive concept.

Referring to FIG. 1, an HDD according to the present invention includes a disk pack 10 having at least one disk 11, a printed circuit board assembly (PCBA) 20, a cover 30, a head stack assembly (HSA) 40 having an actuator arm 43 and a read/write head 41 supported by the actuator arm 43 for writing data on the disk 11 or reading data from the disk 11, a voice coil motor (VCM) 50 for rotating the actuator arm 43 of the HSA 40, a ramp 60 which facilitates the parking of the read/write head 41 when the disk 11 stops rotating, a latch mechanism 70, and a base 90 supporting the above elements. In FIG. 1, reference numeral 45 denotes an end tab 45 formed at a leading end portion of the actuator arm 43.

In addition to the disk 11, the disk pack 10 includes a shaft 13 whose longitudinal axis is the axis of rotation of the disk 11, a spindle motor hub (not shown) disposed radially outwardly of the shaft 13 and supporting the disk 11, and a clamp 15 coupled to the upper portion of the spindle motor hub by a clamp screw (not shown) with the disk 11 interposed therebetween such that the clamp 15 clamps the disk 11 to the spindle motor hub.

The PCBA 20 includes a printed circuit board (PCB, not shown) and a PCB connector 21 provided at a side of the PCB. A plurality of chips (not shown) and circuits (not shown) are provided on the PCB to control the disk pack 10 and the read/write head 41 and exchange signals with external devices via the PCB connector 21.

The cover 30 seals the upper surface of the base 90 to form a casing having an interior space for accommodating the disk pack 10, the HSA 40, etc. The elements accommodated in the space may be protected by the casing formed by the cover 30 and base 90.

In addition to the aforementioned actuator arm 43 and the read/write head 41, the HSA 40 includes a suspension (not shown) which supports the read/write head 43 and is coupled to an end portion of the actuator arm 43, a pivot shaft holder 44 from which the actuator arm 43 extends, and a bobbin 46 which extends from an opposite side of the pivot shaft holder 44 with respect to the actuator arm 43. The pivot shaft holder 44 is supported by a pivot shaft 42 such that the actuator arm 43 and bobbin 46 are together rotatable about a central longitudinal axis of the pivot shaft 42. The bobbin 46 is juxtaposed with (disposed under) a VCM magnet 51 of the VCM 50. Reference numeral 52 designates a yoke of the VCM for supporting the VCM magnet 51. See FIG. 3.

The read/write head 41 reads information from the disk 11 by detecting a magnetic field emanating from the surface of the disk 11 and writes information onto the disk 11 by magnetizing the surface of the disk 11. To this end, the read/write head 41 includes a read head operative to detect the magnetic field produced by the disk 11 and a write head operative to magnetize the disk 11.

The VCM 50 is a drive motor for rotating the actuator arm 43 of the HSA 40 to move the read/write head 41 to a desired position on the disk 11, and operates according to Fleming's left hand rule. Fleming's left hand rule indicates the direction of an electromagnetic force generated on a conductor when current is applied to the conductor while the conductor is present in a magnetic field. In the case of the HDD 1, the conductor is a VCM coil 47 wound on an upper surface of the bobbin 46, and situated in the magnetic field produced by the VCM magnet 51.

When power is applied to the HDD 1, the disk 11 starts to rotate, and current is supplied to the VCM coil 47. Accordingly, the actuator arm 43 is rotated about (the axis of) the pivot shaft 42 to position the read/write head 41 over the disk 11. More specifically, the actuator arm 43 is rotated counterclockwise by a force generated by the interaction between the electromagnetic field produced by VCM coil 47 when current is supplied to the VCM coil 47 and the magnetic field produced by the VCM magnet 51. As the actuator arm 43 rotates in the counterclockwise direction, the read/write head 41 is moved to the data area of the disk 11 so that a predetermined read/write operation may be performed. Also, at this time, an air current is produced by the rotating disk 11, a lift force created by the air current is exerted on the suspension, and the read/write head 41 supported by the suspension is floated by the lift force above the disk 11 as spaced from a surface of the disk 11 by a predetermined distance. The read/write head 14 can write data onto the disk 11 or read data from the disk 11 while floating above the disk 11.

When the supply of power to the HDD 1 is discontinued, the disk 11 stops rotating and the actuator arm 43 is rotated about (the axis of) the pivot shaft 42 in a direction that causes the read/write head 41 to be parked on the ramp 60. In this state, the end tab 45 at the leading end portion of the actuator arm 43 rests on the ramp 60.

The latch mechanism 70 latches and unlatches the actuator arm 43 using a magnetic force and an electromagnetic force. More specifically, when current is supplied to the VCM coil 47 the latch mechanism 70 automatically unlatches the actuator arm 43 using an electromagnetic force generated by the VCM 50. On the other hand, the latch mechanism 70 effectively and firmly locks the actuator arm 43 in place using a magnetic force when current is not supplied to the VCM coil 47.

Figure 2:
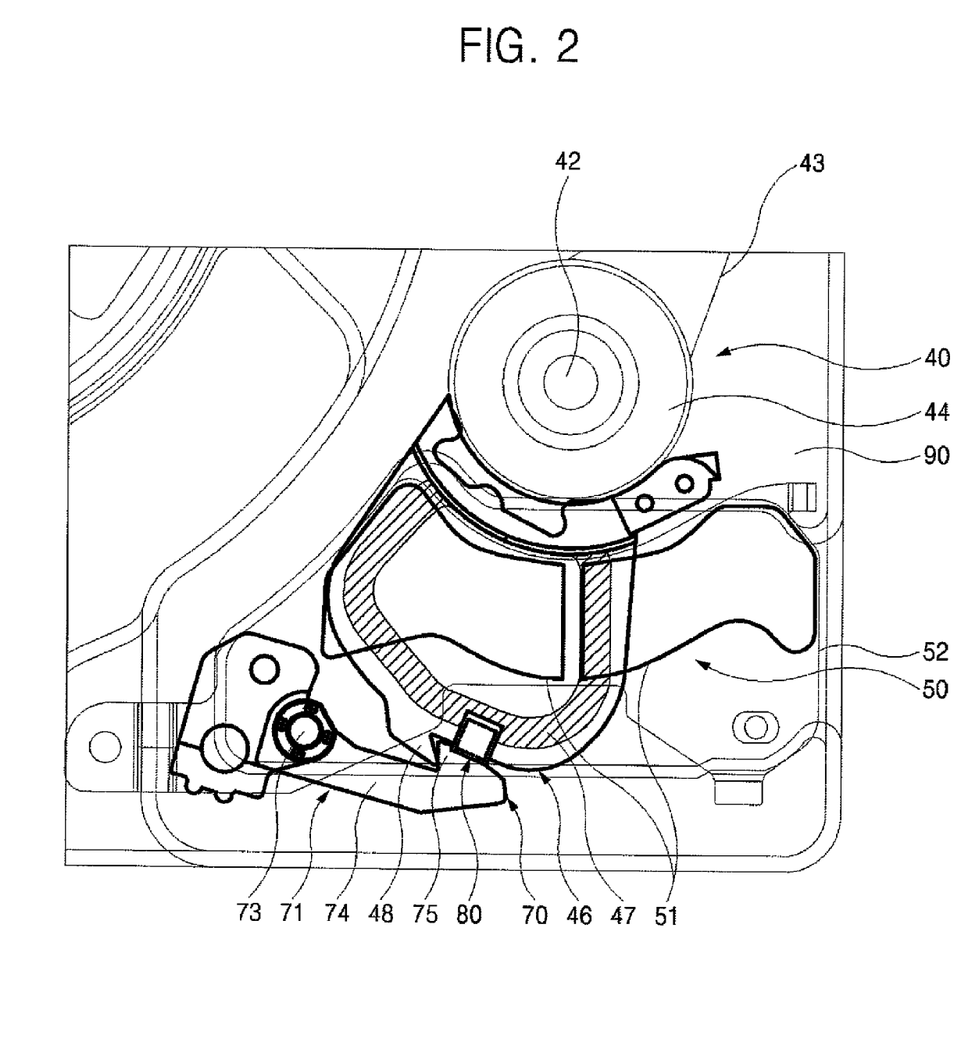
FIG. 2 is a plan view of an actuator latch mechanism of the HDD of FIG. 1.

As illustrated in FIG. 2, the latch mechanism 70 includes a latch lever 71 and a magnetic latch portion 80. The latch lever 71 is mounted to the base 90 so as to be capable of rotating relative to the base 90 and is configured to latch onto or release a bobbin protrusion portion 48 protruding from a side surface of the bobbin 46. More specifically, the latch lever 71 has a pivot 73 coupled to the base 90 and whose longitudinal axis serves as an axis of rotation for the latch mechanism, a latch arm 74 coupled to the pivot 73 so as to be rotatable about the axis of rotation, and a hook 75 provided at a leading end of the latch arm 74. Note, however, the hook 75 is optional as will be clear from the operation of the latch mechanism 70 described below.

The magnetic latch portion 80 is provided on an upper surface of the leading end portion of the latch arm 74. When current is not supplied to the VCM coil 47, the magnetic latch portion 80 interacts with the VCM magnet 51 to generate a magnetic force which keeps the actuator arm 43 and latch lever 71 latched together. On the other hand, when current is supplied to the VCM coil 47, the magnetic latch portion 80 interacts with the VCM coil 47 to generate a force which acts to unlatch the actuator arm 43.

Figure 3:
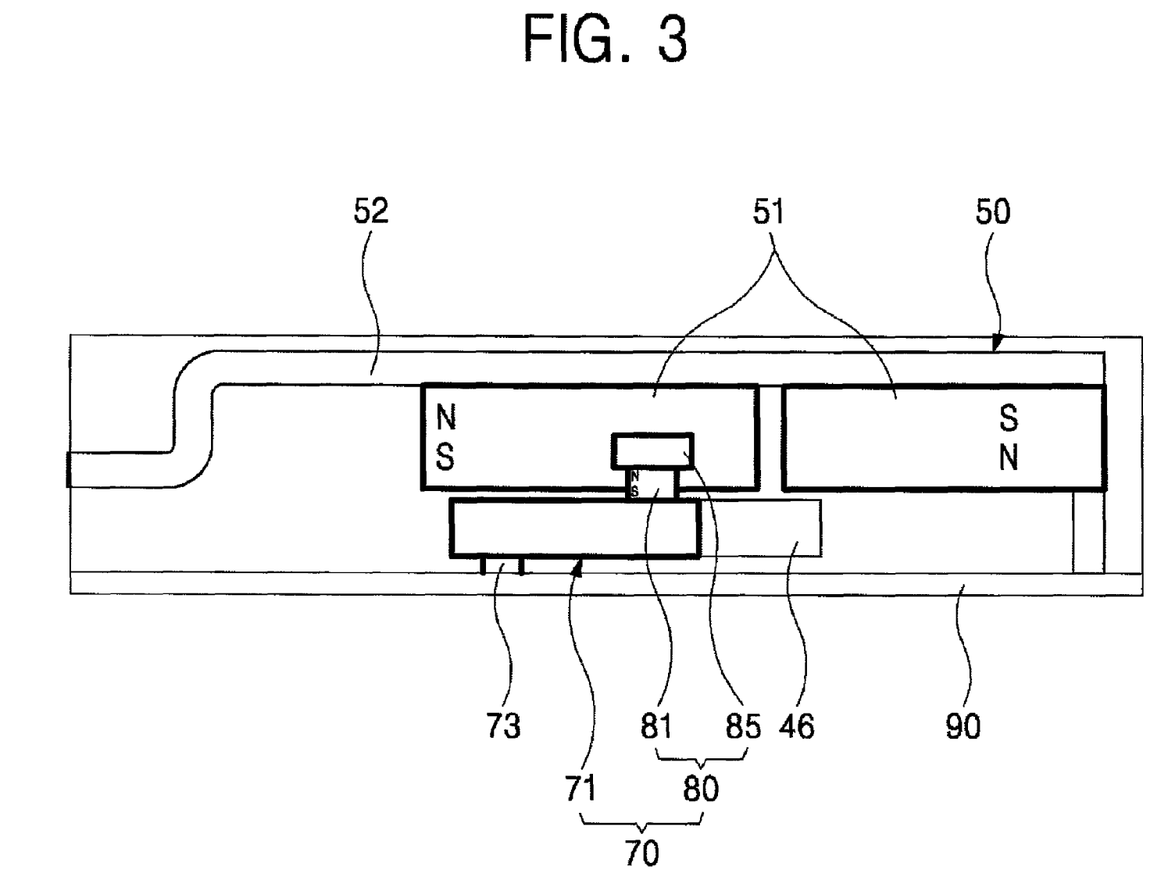
FIG. 3 is a cross-sectional view of part of the HDD shown in FIG. 2.

The magnetic latch portion 80, as illustrated in FIGS. 2 and 3, includes a latch magnet 81 and a latch yoke 85. In the present embodiment, the magnetic latch portion 80 is integrated with the latch lever 71 by an insert injection molding process in which the latch magnet 81 and the latch yoke 85 are inserts (inserted into the mold in which the latch lever 71 is injection molded).

Figure 4:
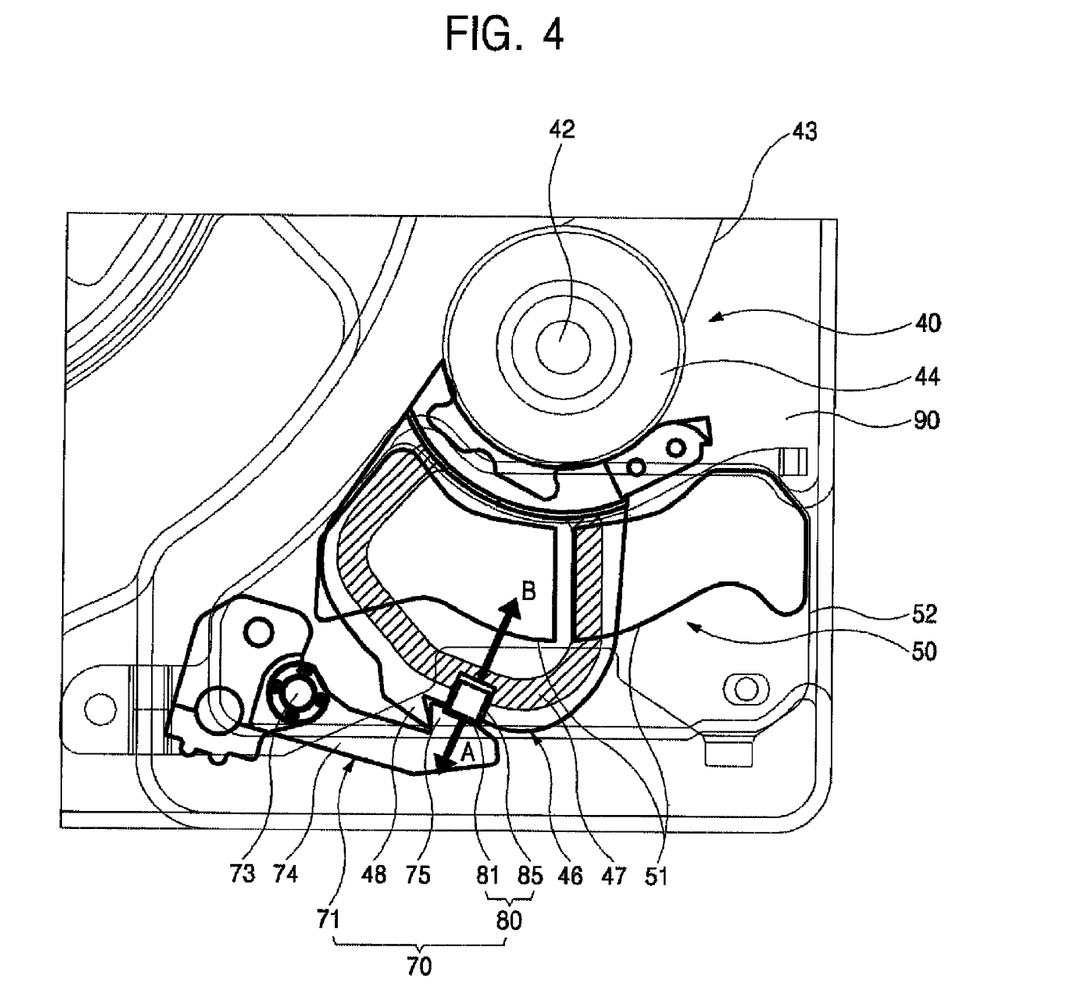
FIG. 4 is another plan view of the actuator latch mechanism illustrating the latched state of the actuator arm when current is not applied to the VCM coil of the HDD.

The latch magnet 81 is provided above the leading end of the latch arm 74 and has the same magnetic polarity as the VCM magnet 51. Accordingly, the latch magnet 81 and the VCM magnet 51 interact to generate a magnetic force of repulsion A (see FIGS. 4 and 5). The latch yoke 85 is provided above the latch magnet 81 and generates a magnetic force of attraction B with respect to the VCM magnet 51 (see FIGS. 4 and 5). For example, when the upper portion of the VCM magnet 51 has an N polarity and the lower portion the VCM magnet 51 has an S polarity in, as illustrated in FIG. 3, the upper portion of the latch magnet 81 also has an N polarity and the lower portion of the latch magnet 81 also has an S polarity. Thus, a magnetic force of repulsion A is generated between the latch magnet 81 and the VCM magnet 51, i.e., the latch magnet 81 and the VCM magnet 51 push each other away from one another.

In the present embodiment, the latch yoke 85 is manufactured of a carbon steel to generate a magnetic force of attraction B with respect to the VCM magnet 51. However, the latch yoke 85 may be manufactured of other magnetic materials according to the present invention.

The latch magnet 81 and the latch yoke 85 are designed such that the force of attraction B between the latch yoke 85 and the VCM magnet 51 is greater than the force of repulsion A between the latch magnet 81 and the VCM magnet 51. Also, the linear section of the VCM coil 47 may be located substantially under the latch magnet 81 when the hook 75 of the latch lever 71 and the protrusion 48 of the bobbin 46 are engaged (latched state of the actuator arm 43). Accordingly, when current is not supplied to the VCM coil 47, a negative (−) torque. i.e., torque acting in a counterclockwise direction, is applied to the latch arm 74 about the axis of the latch pivot 73 such that the latch arm 74 is urged toward the magnet 51. Thus, the latched state of the actuator arm 43 may be maintained even when shock or vibrations are applied to the HDD.

The latch yoke 85 is provided above the latch magnet 81 and seals the upper portion of the latch magnet 81. Therefore, the latch yoke 85 prevents the magnetic flux produced by the latch magnet 81 from escaping when current is supplied to the VCM coil 47, thereby forming a closed loop with the VCM coil 47. Thus, a force C (refer to FIG. 5) acts on the latch magnet 81 in a direction according to Fleming's left hand rule when current is supplied to the VCM coil 47. That is, when current is supplied to the VCM coil 47 to move the read/write head 41 to the data area of the disk 11, the electromagnetic field produced by the VCM coil 47 and the magnetic field produced by the latch magnet 81 act such that the actuator arm 43 is unlatched from the latch lever 71.

Figure 5:
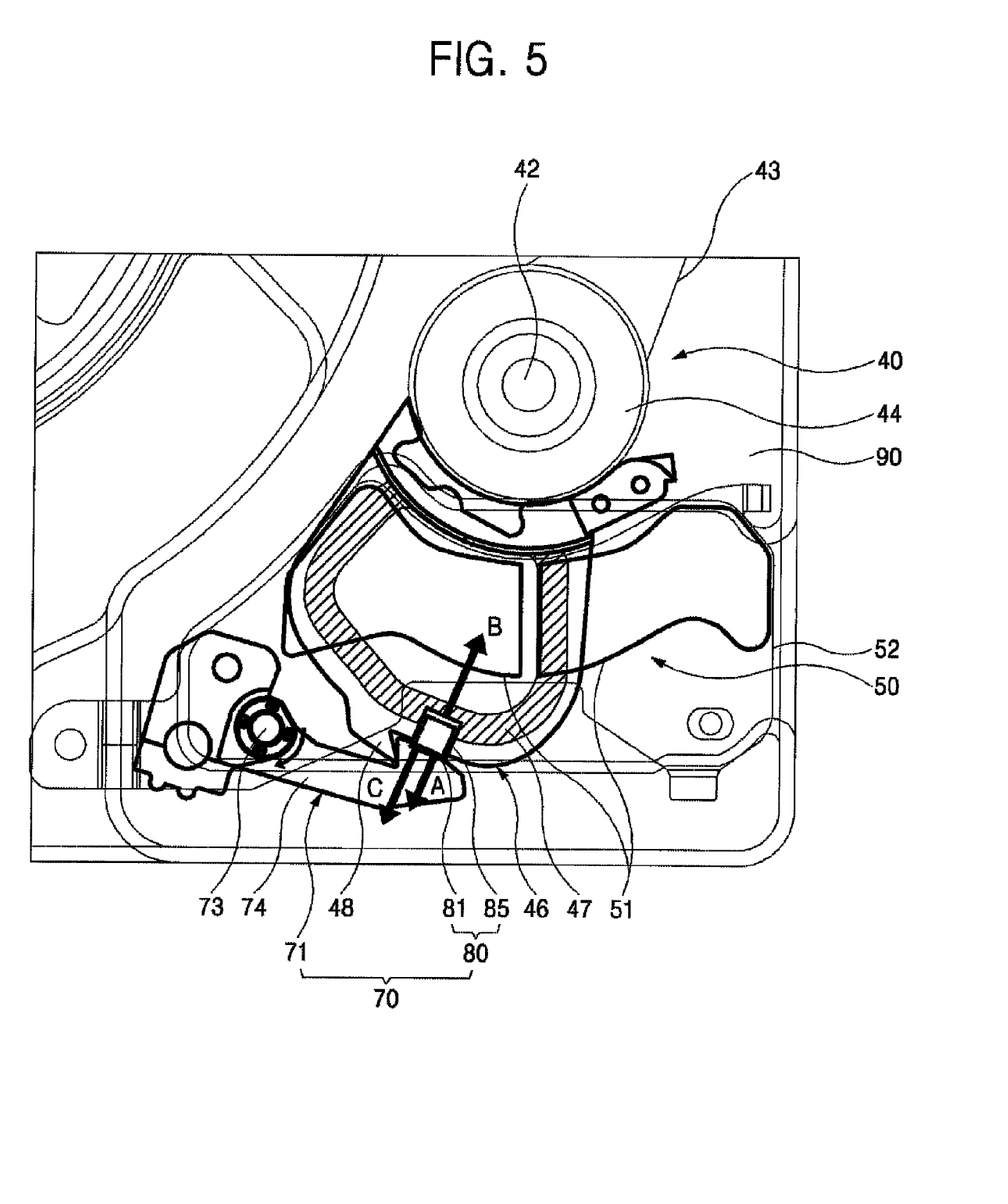
FIG. 5 is a similar plan view but illustrating a state in which the actuator arm is unlatched when current is applied to the VCM coil.
Figure 6:
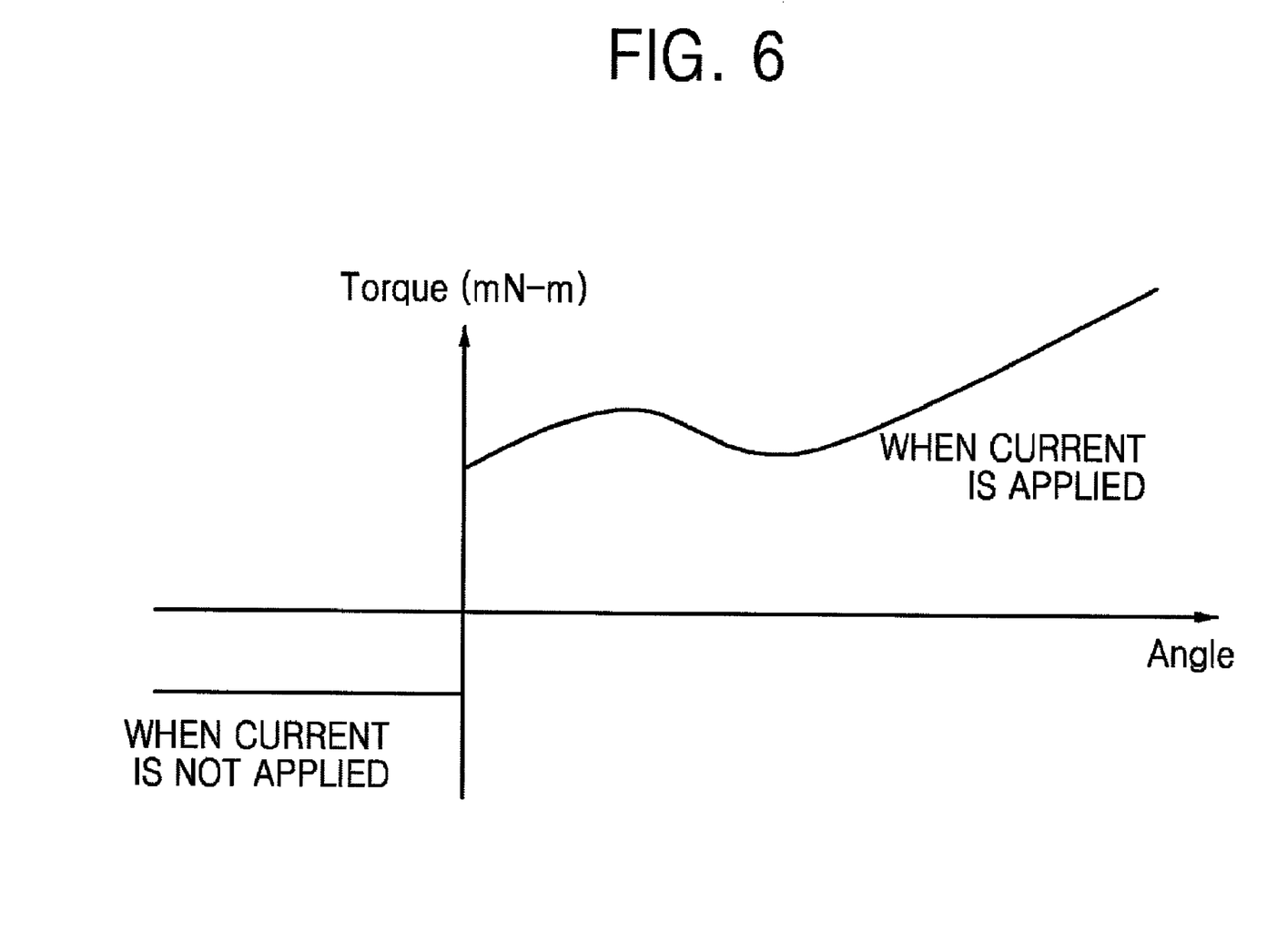
FIG. 6 is a graph of the torque acting on the latch lever when the current is applied to the VCM coil and when current is not applied.

In the structure described above, when current is supplied to the VCM coil 47 of the bobbin 46, as illustrated in FIG. 5, the force C acts on the latch lever 71 in a direction that urges the arm 74 of the latch lever 71 away from the VCM magnet 51, according to Fleming's left hand rule. The sum of the force C and the force A between the magnetic latch portion 80 and the VCM magnet 51 is greater than the force B between the latch yoke 85 and the VCM magnet 51. Therefore, the latch lever 71 rotates clockwise around the pivot 73. That is, as illustrated in FIG. 6, when current is supplied to the VCM coil 47, a positive (+) torque is applied to the arm 74 of the latch lever 71. When the latch arm 74 pivots clockwise, the actuator arm 43 is unlatched and pivots counterclockwise, that is, in a direction toward the disk 11.

According to the present embodiment, when current is not supplied to the VCM coil 47, the actuator arm 43 is locked in place more firmly, compared to HDDs which employ the conventional latch mechanisms, due at least in part to a magnetic force of attraction between the magnetic latch portion 80 of the latch mechanism 70 and the VCM magnet 51. Thus, the actuator arm 43 is prevented from being rotated even when a strong external shock is applied to the HDD 1, so that the read/write head 41 and the disk 11 are prevented from being damaged. Also, when current is supplied to the VCM coil 47, the actuator arm 43 is unlatched smoothly and assuredly. Therefore, the present invention ensures that read/write operations are performed reliably when and as desired.

Finally, although the present invention has been shown and described with reference to the preferred embodiments thereof, it will be understood that various changes in form and details may be made thereto. For example, although the present invention has been shown and described in connection with an HDD employing a ramp loading parking system, the present invention is not limited thereto and can also be applied to an HDD which employs a contact start stop (CSS) parking system. Thus, various changes to and modifications of the disclosed embodiments may fall within the true spirit and scope of the invention as defined by the following claims.

What is claimed is:

1. In a hard disk drive having a base, a read/write head, an actuator arm carrying the read/write head and supported so as to be rotatable relative to the base in a first direction of rotation between a parking position at which the read/write head is parked and a read/write position at which the read/write head performs a read/write operation, a bobbin integral with and extending from a rear end of the actuator arm so as to rotate with the actuator arm, a VCM magnet of a voice coil motor (VCM) juxtaposed with the bobbin, and a coil of the VCM disposed on the bobbin, an actuator latch mechanism comprising:
a latch lever including a latch arm supported so as to be movable relative to the base between a latching position and an unlatching position, wherein the latching position is one at which the latch lever prevents the actuator arm from rotating in the first direction from the parking position to the read/write position, and the unlatching position is one at which the latch lever allows the actuator arm to rotate in the first direction from the parking position to the read/write position; and
a magnetic latch supported by the latch arm and positioned thereby such that while the actuator arm is in the parking position the magnetic latch interacts with magnetic field produced by the VCM magnet to generate a magnetic force of attraction which urges the latch arm towards the latching position, and interacts with the electromagnetic field produced by the VCM coil to generate a magnetic force which urges the latch arm towards the unlatching position.

2. In a hard disk drive as claimed in claim 1, the actuator latch mechanism wherein the magnetic latch includes a latch magnet, and a latch yoke of magnetic material,
the polarity of the latch magnet has the same orientation as that of the VCM magnet, whereby the latch magnet and the VCM magnet repel each other when the actuator arm is in the parking position, and
the magnitude of the magnetic force of attraction between the latch yoke and the VCM magnet is greater than the magnitude of the magnetic force of repulsion between the latch magnet and the VCM magnet when the actuator arm is at the parking position, whereby a net force is produced between the VCM magnet and the magnetic latch which urges the latch arm towards the latching position when current is not being supplied to the VCM coil.

3. In a hard disk drive as claimed in claim 2, and in which the VCM coil has a linear section on the bobbin, the actuator latch mechanism wherein the latch magnet is substantially located above the linear section of the VCM coil when the actuator arm is in the parking position and the magnetic latch is in the latching position such that when current is being supplied to the VCM coil the sum of the magnitudes of the magnetic force of repulsion between the latch magnet and the VCM coil and the magnetic force of repulsion between the latch magnet and the VCM magnet is greater than the magnitude of the magnetic force of attraction between the latch yoke and the VCM magnet.

4. In a hard disk drive as claimed in claim 2, the actuator latch mechanism wherein the latch yoke is of carbon steel.

5. In a hard disk drive as claimed in claim 2, the actuator latch mechanism wherein the latch yoke is disposed on the latch magnet such that magnetic flux of the magnetic field generated by the latch magnet when current is supplied to the VCM coil forms a closed loop through the latch yoke and the latch lever.

6. In a hard disk drive as claimed in claim 2, wherein the magnetic latch is integrally formed with the latch lever by an insert injection mold method using the latch magnet and the latch yoke as inserts.

7. In a hard disk drive as claimed in claim 1, the actuator latch mechanism wherein the latch arm of the latch lever is mounted as to be rotatable relative to the base between the latching and unlatching positions, and the latch lever has a hook at a leading end of the latch lever.

8. A hard disk drive comprising:
a base;
an actuator arm mounted to the base so as to be rotatable relative to the base, a read/write head carried by the actuator arm at a forward end of the actuator arm, and a bobbin extending from a rear end of the actuator arm;
a voice coil motor (VCM) that rotates the actuator arm, the VCM including a VCM permanent magnet fixed relative to the base and juxtaposed with the bobbin of the actuator arm, and a coil disposed on the bobbin of the actuator arm, whereby the coil generates an electromagnetic field when current is supplied thereto, and the electromagnetic field and the magnetic field of the VCM magnet interact to create torque acting on the actuator arm; and
magnetic latch means for generating a magnetic field that interacts with the magnetic field of the VCM magnet to generate a magnetic force of attraction with the VCM magnet which urges the latch arm towards the latching position, and for generating a magnetic field that interacts with the electromagnetic field generated by the VCM coil to generate a magnetic force of repulsion with the VCM coil which urges the latch arm towards the unlatching position.

9. A hard disk drive comprising:

a base;

an actuator arm mounted to the base so as to be rotatable relative to the base, a read/write head carried by the actuator arm at a forward end of the actuator arm, and a bobbin extending from a rear end of the actuator arm;

a permanent magnet of a voice coil motor (VCM) fixed to the base, and an electromagnet of the VCM comprising a coil disposed on the bobbin of the actuator arm; and a latch mechanism including a latch arm mounted to the base so as to be moveable relative to the base between a latching position and an unlatching position, and a magnetic latch carried by the latch arm, the magnetic latch including a permanent latch magnet, and a yoke of magnetic material, wherein the latching position is one at which the latch lever prevents the actuator arm from rotating in a first direction, and the unlatching position is one at which the latch lever allows the actuator arm to rotate in the first direction.

10. The hard disk drive of claim 9, wherein the polarity of the latch magnet has the same orientation as that of the permanent magnet of the VCM, whereby the latch magnet and the magnet of the VCM repel each other, and the latch yoke is disposed on the latch magnet.

11. The hard disk drive of claim 10, wherein the VCM coil has a linear section on the bobbin, the latch magnet is substantially located above the linear section of the VCM coil when the bobbin of the actuator arm and the latch arm of the latch lever are disposed adjacent one another.

12. The hard disk drive of claim 10, wherein the latch yoke is of carbon steel.

13. The hard disk drive of claim 10, wherein the latch yoke is disposed on the latch magnet such that magnetic flux of the magnetic field generated by the latch magnet when current is supplied to the VCM coil forms a closed loop through the latch yoke and the latch lever.

14. The hard disk drive of claim 10, wherein the magnetic latch is integrally formed with the latch lever by an insert injection mold method using the latch magnet and the latch yoke as inserts.

15. The hard disk drive of claim 9, wherein the latch arm of the latch lever is mounted as to be rotatable relative to the base, and the latch lever has a hook at a leading end of the latch lever.

* * * * *